United States Patent [19]

Laitar

[11] 4,246,157
[45] Jan. 20, 1981

[54] BINDER COMPOSITIONS CONTAINING PHENOLIC RESINS AND ORGANIC PHOSPHATE AND/OR CARBONATE SOLVENTS

[75] Inventor: Robert A. Laitar, Woodridge, Ill.

[73] Assignee: Acme Resin Corporation, Forest Park, Ill.

[21] Appl. No.: 19,980

[22] Filed: Mar. 7, 1979

Related U.S. Application Data

[63] Continuation of Ser. No. 879,770, Feb. 21, 1978, abandoned.

[51] Int. Cl.$^3$ .............................................. C08K 5/52
[52] U.S. Cl. .............................. 260/30.6 R; 528/155
[58] Field of Search ............... 260/31.8 T, 30.4 N, 260/30.6 R, 38, DIG. 40; 528/129, 155

[56] References Cited

U.S. PATENT DOCUMENTS 2,374,136   4/1945   Rothrock ........................... 260/22 R
3,537,952   11/1970  Dahms .............................. 260/30.6 R
4,048,145   9/1977   Moss .................................. 528/155

Primary Examiner—Paul R. Michl
Attorney, Agent, or Firm—Stanley M. Parmerter

[57] ABSTRACT

There are provided binder compositions particularly useful in the foundry art which are rapid curing and which comprise (A) a phenolic resin component including at least one resole or novolak resin, solvent comprising a mixture of (1) hydrocarbon solvent and (2) polar organic solvent containing at least sufficient organic phosphate and/or carbonate ester to increase the curing speed and solubility of the phenolic resin component, (B) an isocyanate component having a functionality of two or more and (C) sufficient catalyst to catalyze substantially completely the reaction between components (A) and (B). There is also provided a moldable composition comprising aggregate material, such as foundry sand, and such binder compositions and foundry cores or molds made therefrom and including a process for their manufacture from the moldable compositions by either "cold box" or "no-bake" procedures.

56 Claims, No Drawings

BINDER COMPOSITIONS CONTAINING PHENOLIC RESINS AND ORGANIC PHOSPHATE AND/OR CARBONATE SOLVENTS

This is a continuation of application Ser. No. 879,770 filed Feb. 21, 1978 now abandoned.

This invention relates to binder compositions, moldable compositions including the same and aggregate material, cores or molds made therefrom and a process for making the same. More particularly, the invention relates to foundry binder compositions, moldable compositions including the same and aggregate material and foundry cores or molds made therefrom, including a process for their manufacture.

BACKGROUND OF THE INVENTION

Binders or binder systems for foundry cores and molds are known. Generally, such binders should exhibit good thermal and dimensional stability in order to result in good dimensionally accurate metal castings. In addition, such binder systems should have rapid curing times and exhibit uniform curing properties, that is, the centers of cores or molds made therewith should be as well cured and as strong as their surfaces in order to minimize breakage or warpage.

In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or patterns and then cured with the use of catalysts and/or heat to a solid, cured state.

While many of the known binders or binder systems prepared with aggregate material, such as sand, and a binding amount of a binder, such as polymerizable or curable material, possess the required properties mentioned above and are suitable for use in the foundry industry, even further improvements in such materials are required so that they exhibit even better properties and readily lend themselves to suitable core or mold making processes.

In this respect, there have been developed in the foundry industry, a variety of different processes for forming molds or cores, the particular process employed being dependent upon the binder or binder system being utilized. For example, many liquid binder systems require that curing and hardening be accomplished in a holding pattern or core box while subjected to heat. An example of this type of process is the commonly known "hot box" process. An exemplary process of this type is disclosed in U.S. Pat. No. 3,306,864.

On the other hand, some binder systems, such as for example the phenol-formaldehyde benzylic ether resin systems, do not require heating. Such systems are utilized in processes, commonly referred to as "cold box" processes which are accomplished by passing gaseous catalyst through molded resin coated sand at ambient temperatures in order to achieve curing. In such systems, the resinous material is generally dissolved in a solvent and the type of solvent used affects curing speed and tensile strength. "Cold box" binders and processes as well as solvents employed therein are disclosed in U.S. Pat. No. 3,905,934 and 3,409,579.

Still other types of binder systems do not require gassing or heating in order to bring about curing or hardening.

Such systems are known as "no-bake" binders. Typical "no-bake" polyurethane binding systems of this type are disclosed in U.S. Pat. Nos. 3,499,861, 3,676,392 and 3,686,106. While these types of systems do not require gassing, many exemplary "no-bake" resinous systems, on the other hand, still require relatively long time periods to accomplish substantially complete curing at ambient temperatures or even under some heat.

Furthermore, although developments in resinous binder systems which can be processed according to the "cold box" process have resulted in the provision of useful systems based on phenol-formaldehyde benzylic ether resins and isocyanates which are employed with various solvents, the selection of which solvents materially affects curing speed and tensile strength, as disclosed in the above-mentioned U.S. Pat. Nos. 3,905,934 and 3,409,579, such systems still exhibit certain disadvantages. For example, while such systems are particularly useful in the foundry art in making cores or molds, they are somewhat deficient in that the molds or cores made therewith exhibit relatively low hot strength which often results in casting defects such as, "burn in" and erosion during use. There still exists, therefore, a need for the development of resinous systems which exhibit even more improved curing speeds, thus resulting in decreased production time per unit and, consequently, increased productivity, as well as providing molds therewith which have increased hot strength and, as well, elimination of casting defects, such as "burn in" and erosion. Moreover, there also exists a need for binder systems which readily lend themselves to processing to a molded, cured state by either "cold box" or "no-bake" processes. The present invention fulfills such needs.

BRIEF STATEMENT OF THE INVENTION

In accordance with this invention there is provided a binder composition comprising (A) a phenolic resin component including at least one phenolic resin selected from the group consisting of phenolic resole resins and phenolic novolak resins, sufficient solvent to reduce the viscosity of the phenolic resin component to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase curing speed and solubility of the phenolic resin component, (B) an isocyanate component having a functionality of two or more and (C) sufficient catalyst to catalyze substantially completely the reaction between components (A) and (B).

Additionally, in accordance with the invention, there is provided a moldable composition comprising aggregate material, such as foundry sand and a binder comprising components (A) and (B), sufficient solvent to reduce the viscosity of component (A) to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase curing speed and solubility of component (A) and (C) sufficient catalyst to catalyze substantially completely the reaction between components (A) and (B).

Further, in accordance with this invention there is provided shaped foundry cores or molds comprising foundry sand and a binding amount of a binder composition comprising the reaction product of components (A) and (B) and polar organic solvent containing at least sufficient organic ester selected from the group consisting of organic phosphate and organic carbonate esters and mixtures thereof.

Finally, in accordance with the invention there is provided a process for making foundry cores or molds comprising admixing aggregate material, such as foundry sand or the like, and a binding amount of a binding composition comprising (A) a phenolic resin component including at least one phenolic resin selected from the group consisting of phenolic resole resins and phenolic novolak resins, sufficient solvent to reduce the viscosity of the phenolic resin component to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase the curing speed and solubility of the phenolic resin component and (B) an isocyanate component having a functionality of two or more, continuing mixing of the resultant admixture and coating the aggregate material with the binding compositions, shaping the coated aggregate material as a core or mold, reacting components (A) and (B) in the presence of (C) sufficient catalyst to bring about substantially complete reaction between these components and forming a shaped foundry core or mold.

DESCRIPTION OF THE PREFERRED EMBODIMENTS

Component (A) the phenolic resin component employed in the practice of this invention can vary widely. It may be any phenolic resin which is substantially free of water, that is, contains less than about 5 percent and preferably less than about 1 percent water, based on the weight of the resin, and which is soluble in the solvents employed, such as phenolic resole or phenolic novolak resins formed by reacting phenolic compounds with aldehydes. Resole or A-stage resins, as well as resitole or B-stage resins may be made by reacting a molar excess of aldehyde, such as formaldehyde, with a phenolic compound, such as phenol, in the presence of an alkaline catalyst or metal ion catalysts; while the novolak resins may be formed by reacting a molar excess of phenolic component with an aldehyde in the presence of an acid catalyst.

The phenols employed in the formation of the phenolic resin component of this invention are generally any of the phenols which may be utilized in the formation of phenolic resins and include substituted phenols as well as unsubstituted phenol per se. The nature of the substituent can vary widely and exemplary substituted phenols include alkyl-substituted phenols, aryl-substituted phenols, cycloalkyl-substituted phenols, alkenyl-substituted phenols, alkoxy-substituted phenols, aryloxy-substituted phenols, and halogen-substituted phenols, the substituent groups containing from 1 to 26 or more carbon atoms and preferably from 1 to 6 carbon atoms. Specific suitable exemplary phenols include, in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, -cyclohexyl phenol, p-octyl phenol, 3,5-dicyclohexyl phenol, p-phenyl phenol p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such specific suitable exemplary phenols can be described by the general formula:

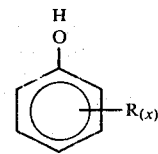

wherein R is hydrogen, a hydrocarbon radical, or oxyhydrocarbon radical or halogen, x is an integer from 0 to 3 and R may be the same or different. The preferred phenolic compounds are o-cresol and phenol.

The aldehyde employed in formations of the phenolic resin component employed in this invention can also vary widely. In general, suitable aldehydes include any of the aldehydes heretofore employed in the formation of phenolic resins as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The preferred phenolic resin components employed in the practice of this invention are resole resins made from o-cresol and formaldehyde at a mole ratio of formaldehyde to o-cresol in a range of from about 0.9 to about 2.0. Such phenolic resin components exhibit particularly good solubility in the solvents used in the practice of this invention which are described more particularly hereinbelow, cure rapidly, and, in addition, exhibit both high tensile strengths and high hot strengths. It is to be understood, however, that in general mixtures of suitable phenolic resin components can also be used in the practice of this invention.

Component (B), the isocyanate component which can be employed in a binder according to this invention may likewise vary widely and has a functionality of 2 or more. Exempletive of the useful isocyanates are organic polyisocyanates such as 2,4-tolylene diisocyanate, 2,6-tolylene, diisocyanate, and mixtures thereof, and particularly the crude mixtures thereof that are commercially available. Other typical polyisocyanates include methylene-bis-(4-phenyl isocyanate), n-hexyl diisocyanate, 1,5-naphthalene diisocyanate, 1,3-cyclopentylene diisocyanate, p-phenylene diisocyanate, 2,4,6-tolylene triisocyanate, 4,4',4''-triphenylmethane triisocyanate. Higher isocyanates are provided by the liquid reaction products of (1) diisocyanates and (2) polyols or polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following general formula:

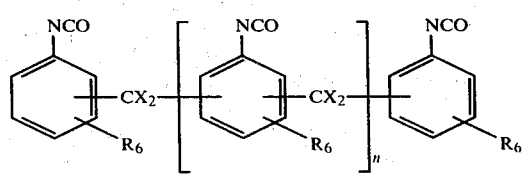

wherein $R_6$ is selected from the group consisting of hydrogen, chlorine, bromine, alkyl groups having 1 to 5 carbon atoms, and alkoxy groups having 1 to 5 carbon atoms; X is selected from the group consisting of hydrogen, alkyl groups having 1 to 10 carbon atoms and phenyl; and n has an average value of at least about 1 and generally about 1 to about 3. A typical commercially available isocyanate is polymethylene polyphenylisocyanate such as PAPI-135 sold by Upjohn Co. and having a Brookfield viscosity of about 177 centipoises at 25° C., and an isocyanate equivalent of 134.

Generally, the amounts of the phenolic resin component (A) and the isocyanate component (B) employed in a binder composition of the invention are not critical and can vary widely. However, there should at least be enough of the isocyanate component present to react substantially completely with the phenolic resin component so that there is no significant unreacted excess of either component present when reaction is complete. In this regard, the isocyanate component is generally employed in a range of from about 15 percent to about 400 percent by weight, based on the weight of the phenolic resin component and is preferably employed in a range of from about 20 to 200 percent. Moreover, while liquid isocyanates can be used in undiluted form, so long as there is a sufficient amount of organic ester present in a composition according to this invention, in the solvent employed with the phenolic resin component to affect increased curing speed and solubility thereof and provide a composition having high tensile strength and high hot strength when cured, solid or viscous isocyanates, can also be utilized and when employed are generally used with an organic solvent such as those described more fully hereinafter. In this respect, it is to be noted that component (B) the isocyanate component may include up to 80 percent by weight of solvent.

Furthermore, it is to be understood that in accordance with the invention both components (A) and (B) are, as a practical matter, dissolved in the described solvents in order to provide components-solvents mixtures of desirable viscosity and thus facilitate the use of the same, such as in coating aggregate material with the components. In this respect, sufficient solvents are employed to provide a Brookfield viscosity of solutions of components (A) and (B) in suitable solvents which is below about 1,000 centipoises and preferably less than about 250 centipoises. More specifically, while the total amount of solvent can vary widely, it is generally present in a composition of this invention in a range of from about 5 percent to about 70 percent by weight, based on total weight of the phenolic component, and is preferably present in a range of from about 20 percent to about 60 percent by weight.

The solvents which can be employed in the practice of this invention can vary widely so long as they contain, as previously mentioned, sufficient organic phosphate and/or carbonate ester to increase curing speed and solubility of the phenolic resin component. In this respect, generally from about 2 percent or more by weight, based on the weight of the phenolic resin component, of organic phosphate and/or organic carbonate solvents should be present as part of the solvent mixture and preferably from about 4 percent to about 30 percent thereof should be present in a composition of this invention.

The solvents employed in the practice of this invention are generally mixtures of (1) hydrocarbon solvents and (2) polar organic solvents containing organic ester selected from the group consisting of organic phosphate and/or organic carbonate esters.

Suitable exemplary hydrocarbon solvents include aromatic hydrocarbons such as benzene, toluene, xylene, ethyl benzene, high boiling aromatic hydrocarbon mixtures, heavy aromatic naphthas and the like, all of which are particularly useful solvents.

The preferred polar solvents of this invention are organic phosphate esters. They provide good solubility for the phenolic resins, increase the cure speed and also increase hot strengths of the cured foundry cores. Examples of useful phosphates include alkyl phosphates, and the like. Specific examples include trimethyl phosphate, triethyl phosphate, tripropyl phosphate, tributyl phosphate, trihexyl phosphate, Tris (2-ethylhexyl) phosphate, trioctyl phosphate, dodecyl diphenyl phosphate, octyl diphenyl phosphate, tricresyl phosphates, triphenyl phosphate, trixylenyl phosphate, cresyl diphenyl phosphate, tributoxyethyl phosphate, triethoxyethyl phosphate and the like. A particularly useful organic phosphate ester is isodecyldiphenyl phosphate.

In general, the useful organic phosphate esters have the following formula:

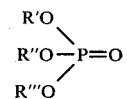

wherein R', R" and R'" may be any combination of alkyl, aryl, aryloxyalkyl, alkoxyalkyl, and substituted aryl groups wherein the radicals contain from 1 to 20 carbon atoms and the substituents on the aryl groups are selected from alkyl, alkoxy and aryl.

Another group of preferred polar solvents are organic carbonates. They provide good solvent solubility characteristics for phenolic resins and increase the curing speeds of phenolic urethane binders. Dialkyl and cyclic carbonates are particularly useful. Alkyl, aryl and diaryl carbonates may also be used. Examples of useful carbonates are propylene carbonate, diethyl carbonate, dipropyl carbonate, dibutyl carbonate, and the like.

Mixtures of hydrocarbon, phosphate and carbonate solvents may be used. Also other polar solvents such as those disclosed in U.S. Pat. No. 3,905,934 may be used in combination with the solvents of this invention.

When such other polar solvents are employed, however, the organic phosphate and organic carbonate esters should still be present in the solvent combination in the amounts mentioned above, it being understood that the total amount of polar solvent and hydrocarbon solvent can vary within all proportions with respect to each other so long as the required amount of the mentioned phosphate and carbonate esters are present and the combination of solvents results in forming solutions with the phenolic resin component and isocyanate component which permit substantially uniform and complete coating of aggregate material, such as sand.

As previously indicated hereinabove, the compositions of this invention can be cured by both the "cold box" and "no-bake" processes. In this connection, the compositions include a suitable catalyst (C). While any suitable catalyst for catalyzing the reaction between the phenolic resin component and isocyanate component may be used, it is to be understood that when employing the "cold box" process the catalyst employed is generally a volatile catalyst. On the other hand, where the "no-bake" process is employed, a liquid catalyst is generally utilized. Moreover, no matter which process is utilized, that is, the "cold box" or the "no-bake" process, at least enough catalyst is employed to cause substantially complete reaction of components (A) and (B).

Preferred exemplary catalysts employed when curing the compositions of this invention by the "cold box" process are volatile tertiary amine gases which are passed through a core or mold generally along with an inert carrier, such as air or $CO_2$. In this respect, it is to be noted that the flow rate may vary widely. In general, the flow rate should be at least sufficient so that substantially complete reaction takes place between components (A) and (B). Exemplary volatile tertiary amine catalysts which result in a rapid cure at ambient temperature that may be employed in the practice of the present invention include trimethyl amine, triethyl amine and dimethyl ethyl amine and the like.

On the other hand, when utilizing the compositions of this invention in the "no-bake" process, liquid tertiary amine catalysts are generally and preferably employed. Exemplary liquid tertiary amines which are basic in nature include those having a $pK_b$ value in a range of from about 4 to about 11. The $pK_b$ value is the negative logarithm of the dissociation constant of the base and is a well known measure of the basicity of a basic material. The higher this number is, the weaker the base. Bases falling within the mentioned range are generally organic compounds containing one or more nitrogen atoms. Preferred among such materials are heterocyclic compounds containing at least one nitrogen atom in the ring structure. Specific examples of bases which have a $pK_b$ value within the range mentioned include 4-alkyl pyridines wherein the alkyl group has from 1 to 4 carbon atoms, isoquinoline, aryl-pyridines, such as phenyl pyridine, pyridine, acridine, 2-methoxy pyridine, pyridazines, 3-chloro pyridine, quinoline, N-methyl imidazole, 4,4-dipyridine, phenyl-propyl pyridine, 1-methyl benzimidazole and 1,4-thiazine. Additional exemplary, suitable preferred catalysts include but are not limited to tertiary amine catalysts such as N,N-dimethylbenzyl amine, triethylamine, tribenzyl amine, N,N-dimethyl-1,3-propane diamine, N,N-dimethylethanol amine and triethanolamine. It is to be understood that various metal organic compounds can also be utilized alone as catalysts or in combination with the previously mentioned catalysts. Examples of useful metal organic compounds which may be employed as added catalytic materials are cobalt naphthenate, cobalt octoate, dibutyl tri-dilaurate, stannous octoate and lead naphthenate and the like. When used in combinations, such catalytic materials, that is the metal organic compounds, the nitrogen containing catalysts and amine catalysts, may be employed in all proportions with each other.

It is to be further understood that when utilizing the compositions of this invention in the "no-bake" process, the amine catalysts, if desired, can be dissolved in suitable solvents such as, for example, the hydrocarbon solvents mentioned hereinabove. The liquid amine catalysts are generally employed in a range of from about 0.5 percent to about 15 percent by weight, based on the weight of the phenolic resin component present in a composition in accordance with the invention.

When employing a binder composition of this invention in the "no-bake" process, the curing time can be controlled by varying the amount of catalyst added. In general, as the amount of catalyst is increased to cure time decreases. Furthermore, curing takes place at ambient temperature without the need for subjecting the compositions to heat, or gassing or the like. In this regard, however, in usual foundry practice pre-heating of the sand is often employed to raise the temperature of the sand to from about 30° F. up to as high as 120° F., and preferably up to about 75° F. to 100° F. in order to accelerate the reactions and control temperature and thus provide a substantially uniform operating temperature on a day to day basis. However, it is to be understood that such preheating is neither critical nor necessary in carrying out the practice of this invention.

While the binder compositions of this invention may be employed by admixing the same with a wide variety of particulate materials, such as limestone, calcium silicate and gravel and the like, in order to bind the same, and the admixture then manipulated in suitable fashion to form coherent shaped structures, they are particularly useful in the foundry art as binding compositions for foundry sand. When so employed, the amount of binder and sand can vary widely and is not critical. On the other hand at least a binding amount of the binding composition should be present in order to coat substantially completely and uniformly all of the sand particles and to provide a uniform admixture of the sand and binder and, so that when the admixture is conveniently shaped as desired and cured, there is provided a strong, uniform, shaped article which is substantially uniformly cured throughout, thus minimizing breakage and warpage during handling of the shaped article, such as, for example, sand molds or cores, so made. In this regard, the binder may be present in a moldable composition in accordance with this invention in a range of from about 0.7 percent to about 4.0 percent by weight based on the total weight of the composition.

Other commonly employed additives can be optionally used in the binder compositions of this invention. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes such as, for example, gamma-aminopropyl trimethoxy silane, gamma-hydroxy propyl-trimethoxy silane, 3-ureidopropyl triethoxysilane, gamma-mercaptopropyl-trimethoxy-silane, gamma-glycidoxypropyltrimethoxy-silane, beta-(3,4-epoxycylohexyl)- trimethoxysilane, N-beta-(amino-ethyl)-gamma-aminopropyltrimethoxy-silane and the like.

In the practice of this invention additives normally utilized in foundry manufacturing processes can also be added to the compositions during the sand coating procedure. Such additives include materials such as iron oxide, clay, carbohydrates, potassium fluoroborates, wood flour and the like.

In general the process for making a moldable composition in accordance with this invention comprises admixing aggregate material with at least a binding amount of (A) a phenolic resin component including at least one phenolic resin selected from the group consisting of phenolic resole resins and phenolic novolak resins dissolved in sufficient solvent to reduce the viscosity of the phenolic resinous component to below about 1000 centipoises, the solvent comprising a mixture of (1) hydrocarbon solvent and (2) polar organic solvent containing at least sufficient organic ester selected from the group consisting of organic phosphate and organic carbonate esters and mixtures thereof to increase curing speed and solubility of the phenolic resin component and (B) an isocyanate component having a functionality of two or more, agitating the admixture and substantially completely and uniformly coating the aggregate material with components (A) and (B), suitably manipulating the admixture conveniently, as for example, by distributing the same in a suitable core box or pattern adding to the admixture at least a sufficient amount of catalyst to substantially completely catalyze the reaction between components (A) and (B), curing the admixture and forming a shaped product.

It is to be understood that there is no criticality in the order of mixing the constituents with the aggregate material. On the other hand, the catalyst should generally be added to the mixture as the last constituent of the composition so that premature reaction between components (A) and (B) does not take place. It is to be further understood that as a practical matter, the phenolic resin component (A) can be stored separately and mixed with solvent just prior to use or, if desirable, mixed with solvent and stored until ready to use. Such is also true with component (B), the isocyanate component. On the other hand, components (A) and (B), as a practical matter, should not be brought into contact with each other until ready to use in order to prevent any possible premature reaction which might take place and in this regard components (A) and (B) may be mixed with the aggregate material either simultaneously or one after the other in suitable mixing devices, such as mullers, continuous mixers, ribbon blenders and the like, while continuously stirring the admixture to insure uniform coating of aggregate particles.

More specifically, however, when the admixture is to be cured according to "cold box" procedures, the admixture after shaping as desired, is subjected to gassing with an amine catalyst in air and the flow rate of catalyst through the shaped admixture should be sufficient to provide sufficient catalyst to substantially complete reaction between components (A) and (B), the flow rate being dependent, of course, on the size of the shaped admixture as well as the amount of phenolic resin therein. In this respect, the cure time of cores 2 inches in diameter by 2 inches in length and having a weight of about 170 grams when subjected to gassing with triethyl amine in air at a flow rate in a range from about 3 liters per minute to about 6 liters per minute exhibit curing time less than about 40 seconds.

In contrast, however, when the admixture is to be cured according to "no-bake" procedures, the catalyst is added to the aggregate material simultaneously or preferably after coating the aggregate material with components (A) and (B), the admixture then being shaped and simply permitted to cure until reaction between components (A) and (B) is substantially complete and thus forming a shaped product such as a foundry core or mold. On the other hand it is to be understood that the catalyst may also be admixed with either one of the components (A) or (B) prior to coating of the aggregate material with the components.

Consequently, by so proceeding, as indicated with an admixture of foundry sand and a binding amount of components (A) and (B) there is formed a foundry core or mold comprising foundry sand and a binding amount of a binder composition comprising the reaction product of components (A) and (B) and polar organic solvent containing at least sufficient organic esters selected from the group consisting of organic phosphate and organic carbonate esters and mixtures thereof.

THE EXAMPLES

The following specific examples of the present invention are set forth in order to illustrate the same. It is to be understood that the examples are illustrative only and are not intended to limit the invention in any way. In the examples all parts and percents are by weight, the temperatures are degress centigrade and the viscosity values are in centipoises, unless otherwise indicated.

EXAMPLES I-VII

These examples illustrate the preparation of an o-cresol resole resin component (A) and solutions thereof with various solvent as well as an isocyanate solution component (B) and use of the same in the practice of the present invention by "cold box" procedures to make foundry cores. The examples further illustrate that the cure times at various catalyst rates are consistently shorter where the compositions contain phosphate or carbonate esters in comparison to compositions containing other polar solvents.

An o-cresol resole is prepared from 2160 grams of a commercially available mixture consisting of approximately 80% o-cresol and 20% phenol and 1200 grams of 50% formaldehyde solution, using 21.6 grams of lime as the catalyst. The reactants are stirred at 70° C. until the free formaldehyde dropped to 0.15%. After cooling to 45° C., the pH is adjusted to 6.4 by the addition of 26 grams of sulfuric acid, diluted with 124 grams of water. The resin is dehydrated under vacuum to a refractive index of 1.570 at about 25° C. The resole is then heated at 110° C. for two hours and dehydrated under vacuum until the water content is 0.4%. The resin formed is then diluted with the solvent combinations listed in Table 1 to provide solutions having viscosities in a range of from about 150 to 500 centipoises.

The isocyanate solution listed in Table 1 is prepared by dissolving 75% polymethylene polyphenylisocyanate in 25% of Aromatic 100 hydrocarbon solvent, having a boiling point of 155°–170° C. sold by Exxon Company, the solution having a viscosity in a range of about 38 centipoises.

In order to provide moldable compositions suitable for foundry cores, admixtures of foundry sand are made with the various solutions of the o-cresol resole and the isocyanate solution and tested for cure speeds, the results being set forth in Table 1. The foundry sand mixes are prepared as follows: First, 25 grams of resin solution listed in Table 1 are mixed with 2500 grams Lake sand for one minute using a K-45 Kitchen Aid mixer. The polymeric isocyanate solution, 25 grams, is added and mixing continued for two minutes. The resulting foundry sand mix is tested for cure speed, defined as the time required to cure through a 2" diameter×2" high core. The test specimen is prepared from 170 grams of the foundry sand mix by standard AFS procedures, using a Dietert No. 315 sand rammer and a Dietert No. 315-9 specimen tube. Gassing is accomplished at ambient temperatures by setting the air flow at the desired rate, passing it over liquid triethylamine, and through a Dietert gassing attachment. The core is retained in the specimen tube, which is placed on top of the gassing attachment and a timer started. While the tertiary amine gas is passing up through the bottom of the core, the top surface of the core is probed until it hardens and the required time is noted. The cure times at various catalyst flow rates are consistently shorter for the phosphate ester or carbonate containing resins, than for resins containing other polar solvents as may be seen in Table 1.

TABLE 1

|  | I | II | III | IV | V | VI | VII |
|---|---|---|---|---|---|---|---|
| O-Cresol-formaldehyde resin | 55.0 | 55.0 | 55.0 | 55.0 | 55.0 | 55.0 | 55.0 |
| Aromatic solvent | 40.5 | 40.5 | 40.5 | 40.5 | 40.5 | 40.5 | 40.5 |
| Release agent | 0.2 | 0.2 | 0.2 | 0.2 | 0.2 | 0.2 | 0.2 |
| Silane A-186 | 0.2 | 0.2 | 0.2 | 0.2 | 0.2 | 0.2 | 0.2 |
| Butyl cellosolve acetate | 4.5 | — | — | — | — | — | — |
| Di-iso-butyl phthalate | — | 4.5 | — | — | — | — | — |
| Triethyl phosphate | — | — | 4.5 | — | — | — | — |
| Tributyl phosphate | — | — | — | 4.5 | — | — | — |
| Tricresyl phosphate | — | — | — | — | 4.5 | — | — |
| Propylene carbonate | — | — | — | — | — | 4.5 | — |
| Dibutyl carbonate | — | — | — | — | — | — | 4.5 |
| Sand Tests |  |  |  |  |  |  |  |
| Lake sand | 100 | 100 | 100 | 100 | 100 | 100 | 100 |
| Polyisocyanate solution | 1 | 1 | 1 | 1 | 1 | 1 | 1 |
| Resin solution | 1 | 1 | 1 | 1 | 1 | 1 | 1 |
| Cure time of 2" dia. × 2" core (170g) in sec. |  |  |  |  |  |  |  |
| Flow rate |  |  |  |  |  |  |  |
| 3 l/min. | 51 | 72 | 36 | 33 | 41 | 37 | 46 |
| 6 l/min. | 27 | 29 | 24 | 21 | 27 | 24 | 26 |
| 9 l/min. | 21 | 24 | 15 | 15 | 18 | 14 | 30 |

EXAMPLE VIII

This example illustrates the making of an o-cresol resin with a different reaction catalyst than used in Examples I–VII. Zinc acetate is used in place of lime. It also illustrates using combinations of solvents.

An o-cresol resole is prepared from 2940 parts of commercial 80% o-cresol and 2450 parts of 50% aqueous formaldehyde using 88 parts of zinc acetate as a catalyst. The mixture is reacted at 95° C. until the free formaldehyde is between 4.2 and 4.8%. The batch reaction mixture is then heated under vacuum to 110° C. and stirred for 14 hours. Then 720 parts of Isodecyl diphenyl phosphate, 1440 parts of heavy aromatic solvent having a boiling point of 160°–293° C. and 1440 parts SC-150 aromatic solvent boiling point 183°–210° C. are added thereto. Both aromatic solvents are available commercially from Central Solvents & Chemicals, Chicago, Ill. Then 14.5 parts of A-186 silane sold by Union Carbide Corporation and 14.5 parts of silicone fluid release agent are added and stirred into the reaction mixture. The resin solution has a viscosity of 140 centipoises at 25° C.

This o-cresol resole resin is coated onto sand along with a 75% polymethylene polyphenyl isocyanate solution in Aromatic 100 hydrocarbon solvent as described in Examples I–VII. Cure time tests are run as described in those Examples. At gassing flow rates of 3 liters per minute and 6 liters per minute, the cure times are 26.5 seconds and 16.0 seconds, respectively. One inch dog bone tensile test specimens are prepared using a Dietert No. 694 core box and cartridge. Sand is blown into the box at 90 pounds per square inch pressure. Tensile specimens are gassed with triethyl amine in air flowing 9 liters per minute and tensiles measured immediately after gassing, one hour and 24 hours after gassing under a Detroit Testing Machine Co., Model CST tensile tester. Tensiles are 133, 265 and 338 pounds per square inch, respectively. These data show that the resin compositions of this invention cure rapidly to give strong foundry cores.

EXAMPLES IX–XII

To a 1 liter flask there is charged 259.5 grams (2.09 moles) of 2-methoxyphenol, 188.0 grams (3.13 moles) of 50% formalin, and 7.8 grams of zinc acetate dihydrate. The reaction mixture is heated at reflux for 18 hours. The resin is dehydrated under 28 inches vacuum and heated until an internal temperature of 110° is reached. These conditions are maintained for 14 hours to give a base resin used to prepare the examples described in Table 2 by the procedures used in the previous Examples, the resin solvents mixtures having a viscosity in a range of 105 to 360 centipoises at 25° C.

TABLE 2

|  | IX | X | XI | XII |
|---|---|---|---|---|
| Base resin from Example IX | 50 | 50 | 50 | 50 |
| Propylene carbonate | 25 | — | — | — |
| Isodecyldiphenyl phosphate | — | 25 | — | — |
| Isophorone | — | — | 25 | — |
| Dibutyl phthalate | — | — | — | 25 |
| Aromatic solvent | 25 | 25 | 25 | 25 |
| Silicone fluid | 0.2 | 0.2 | 0.2 | 0.2 |
| Silane | 0.2 | 0.2 | 0.2 | 0.2 |
| Sand Tests |  |  |  |  |
| Lake sand | 100 | 100 | 100 | 100 |
| Polyisocyanate solution | 1 | 1 | 1 | 1 |
| Resin solution | 1 | 1 | 1 | 1 |
| Cure time of 2" dia. × 2" core (170g) in sec.* |  |  |  |  |
| Flow rate |  |  |  |  |
| 3 l/min. | 20 sec. | 26 sec. | 34 sec. | 38 sec. |
| 6 l/min. | 12 sec. | 16 sec. | 23 sec. | 23 sec. |

*Samples gassed with triethyl amine in air.

These Examples clearly illustrate the unexpectedly improved curing time attained with the organic phosphate and carbonate esters in comparison with other polar solvents.

EXAMPLES XIII–XVII

To a 5 liter flask there is charged 1880 grams (20 moles) of phenol, 1800 grams (30 moles) of 50% formalin, and 56.4 grams zinc acetate dihydrate. The reactants are heated at reflux (100° C.) for 3 hours. After this period, vacuum is applied to the vessel and the resin is cooled to 50° C. by dehydration. The pH is adjusted to 4.5 by the addition of phosphoric acid and dehydration is resumed. The temperature is increased to 90° C. at 28 inches vacuum. The resin is stirred four (4) hours under these conditions to give a base resin which is used to prepare the Examples described in Table 3 by the procedures used in the previous Examples, the resin solvents mixtures having a viscosity in a range of 280 to 510 centipoises at 25° C.

TABLE 3

|  | XIII | XIV | XV | XVI | XVII |
|---|---|---|---|---|---|
| Base resin from Example XIII | 50 | 50 | 50 | 50 | 50 |
| Propylene carbonate | 33.5 | — | — | — | — |
| Tricresyl phosphate | — | 33.5 | — | — | — |
| Isodecyldiphenyl phosphate | — | — | 33.5 | — | — |
| Isophorone | — | — | — | 33.5 | — |
| Dibutyl phthalate | — | — | — | — | 33.5 |
| Aromatic solent | 16.5 | 16.5 | 16.5 | 16.5 | 16.5 |
| Silicone fluid | 0.2 | 0.2 | 0.2 | 0.2 | 0.2 |
| Silane | 0.2 | 0.2 | 0.2 | 0.2 | 0.2 |
| Sand Test |  |  |  |  |  |
| Lake sand | 100 | 100 | 100 | 100 | 100 |
| Resin solution | 1 | 1 | 1 | 1 | 1 |
| Polyisocyanate solution | 1 | 1 | 1 | 1 | 1 |
| Cure time of 2″ dia. × 2″ core (170g) in sec.* |  |  |  |  |  |
| Flow rate |  |  |  |  |  |
| 3 l/min. | 25.0 | 33.5 | 33.5 | 35.0 | 36.5 |

*Samples gassed with triethylamine in air.

These Examples clearly show that the organic phosphate and carbonate esters employed in the compositions of this invention result in faster curing times than do the previously employed isophorone and dibutyl phthalate polar solvents.

EXAMPLE XVIII

This Example demonstrates that resin compositions of this invention are also useful for making foundry cores by the "no-bake" process. A liquid tertiary amine catalyst is used in this case.

To a Hobart A-120 mixer there is added 2500 grams of Wedron 7020 washed and dried silica sand. The mixer is started and 17.5 grams of the o-cresol resin of Example VIII, 17.5 grams of polyisocyanate solution of Example VIII and 0.175 grams of N,N dimethyl ethanol amine are added and mixing continued for one (1) minute, and the sand discharged. Part of the sand is immediately used to form 12 standard American Foundry Society 1 inch dog bone tensile briquets using a Dietert No. 696, 12 gang core box. Cores are cured at room temperature and broken after 1 hour and 24 hour cure times. Tensile strengths are determined using a Detroit Testing Machine Co., Model CST tester. One hour tensile is 60 pounds per square inch and 24 hour tensile is 180 pounds per square inch. The rest of the sand is used to make a pyramid core. A thermometer is inserted into the core. The stripping time thereof is determined as the time at which the core is so hard that the thermometer can no longer be pushed into the core. The strip time is 12 minutes.

Foundry cores or molds made from the moldable compositions of this invention in accordance with the preceding Examples exhibit, in addition to rapid curing times, good thermal and dimensional stability. When used in casting procedures, such molds or cores exhibit good hot strength and result in reduced casting defects such as "burn in" and erosion during use. Moreover, when other phenolic resins, as well as other isocyanates, and polar solvents such as the additional phosphate and carbonate esters such as those disclosed hereinbefore are employed in the Examples as replacements for like materials used therein, similar results are obtained.

The present invention also presents many advantages in addition to those already mentioned above. For example the materials employed in carrying out the invention are generally readily available and can be used on existing equipment presently employed in industry for the fabrication of cores or molds, and in particular in the foundry industry. Moreover, the process of this invention readily lends itself to either "cold box" or "no-bake" procedures currently in use, thus obviating the need for elaborate equipment changes and training of personnel, while at the same time permitting flexibility of choice with respect to utilization of the most convenient and beneficial procedure as desired. Numerous other advantages of the invention will be readily apparent to those skilled in the art.

While the invention has been described in connection with specific embodiments thereof, it is to be understood that it is capable of further modification, and it is intended to cover any variations, uses or adaptations thereof following, in general, the principles of the invention and including such departures from the embodiments disclosed herein as come within the known or customary practice in the art to which the invention pertains and as may be applied to the essential features hereinbefore set forth, and as fall within the scope of the invention.

What is claimed is:

1. A binder composition comprising (A) a phenolic resin component including at least one phenolic resin selected from the group consisting of phenolic resole resins and phenolic novolak resins, sufficient solvent to reduce the viscosity of said phenolic resin component to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase curing speed and solubility of said phenolic resin component, the organic phosphate esters having the formula:

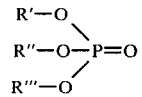

wherein R', R'' and R''' may be any combination of alkyl, aryl, aryloxyalkyl, alkoxyalkyl, and substituted aryl groups wherein the radicals contain from 1 to 20 carbon atoms and the substituents on the aryl groups are selected from alkyl, alkoxy and aryl, (B) an isocyanate component having a functionality of two or more and (C) sufficient catalyst to catalyze substantially completely the reaction between components (A) and (B).

2. A binder composition according to claim 1 wherein the phenolic resin component includes a phenolic resole resin.

3. A binder composition according to claim 2 wherein the phenolic resole resin is an ortho-cresol resole resin.

4. A binder composition according to claim 2 wherein the phenolic resole resin is a 2-methoxy phenol resole resin.

5. A binder composition according to claim 1 wherein the polar organic solvent is triethyl phosphate.

6. A binder composition according to claim 1 wherein the polar organic solvent is tributyl phosphate.

7. A binder composition according to claim 1 wherein the polar organic solvent is tricresyl phosphate.

8. A binder composition according to claim 1 wherein the polar organic solvent is isodecyldiphenyl phosphate.

9. A binder composition according to claim 1 wherein the polar organic solvent is an organic carbonate ester selected from the group consisting of dialkyl carbonates, arylalkyl carbonates, diaryl carbonates and cyclic carbonates and mixtures thereof.

10. A binder composition according to claim 9 wherein the polar organic solvent is propylene carbonate.

11. A binder composition according to claim 9 wherein the polar organic solvent is dibutyl carbonate.

12. A binder composition according to claim 1 wherein the hydrocarbon solvent is selected from the group consisting of aromatic hydrocarbons, high boiling aromatic hydrocarbon mixtures and heavy aromatic naphthas.

13. A binder composition according to claim 1 wherein the isocyanate component is a polyisocyanate having the general formula:

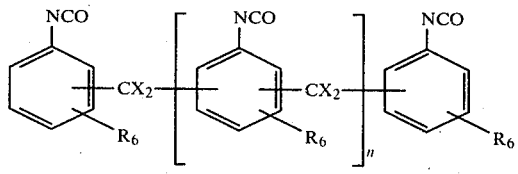

wherein $R_6$ is selected from the group consisting of hydrogen, chlorine, bromine, alkyl groups having 1 to 5 carbon atoms and alkoxy groups having 1 to 5 carbon atomx, X is selected from the group consisting of hydrocarbon, alkyl groups having 1 to 10 carbon atoms and phenyl; and n has an average value of up to about 3.

14. A binder composition according to claim 13 wherein the isocyanate component is methylene-bis(4-phenyl isocyanate).

15. A binder composition according to claim 13 wherein the isocyanate component is polymethylene polyphenylisocyanate.

16. A binder composition according to claim 1 wherein the isocyanate component is employed in a range of about 15% to about 400% by weight, based on the total weight of the phenolic resin component.

17. A binder composition according to claim 1 including polar organic solvent other than polar organic phosphate and polar organic carbonate esters.

18. A binder composition according to claim 1 wherein the organic ester is present in a range of from about at least 2% by weight, based on the total weight of the phenolic resin component.

19. A binder composition according to claim 1 wherein the solvent is employed in a range of from about 5% to about 70% by weight, based on the total weight of the phenolic resin component.

20. A binder composition according to claim 1 wherein the catalyst is a tertiary amine.

21. A binder composition according to claim 20 wherein the catalyst is trimethyl amine.

22. A binder composition according to claim 20 wherein the catalyst is triethyl amine.

23. A binder composition according to claim 20 wherein the catalyst is N,N-dimethylethanol amine.

24. A binder composition according to claim 1 wherein the catalyst is employed in a range of from about 0.5% to about 15% by weight, based on the total weight of the phenolic resin component.

25. A binder composition according to claim 1 including a silane coupling agent.

26. A moldable composition comprising aggregate material and a binder comprising (A) a phenolic resin component selected from the group consisting of phenolic resole resins and phenolic novolak resins, sufficient solvent to reduce the viscosity of said phenolic resin component to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase curing speed and solubility of said phenolic resin component, the organic phosphate esters having the formula:

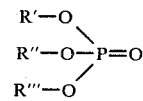

wherein R', R" and R'" may be any combination of alkyl, aryl, aryloxyalkyl, alkoxyalkyl, and substituted aryl groups wherein the radicals contain from 1 to 20 carbon atoms and the substituents on the aryl groups are selected from alkyl, alkoxy and aryl, (B) an isocyanate component having a functionality of two or more and (C) sufficient catalyst to catalyze substantially completely the reaction between components (A) and (B).

27. A moldable composition according to claim 26 wherein the phenolic resin component includes a phenolic resole resin.

28. A moldable composition according to claim 27 wherein the phenolic resole resin is an ortho-cresol resole resin.

29. A moldable composition according to claim 27 wherein the phenolic resole resin is a 2-methoxy phenol resole resin.

30. A moldable composition according to claim 26 wherein the polar organic solvent is triethyl phosphate.

31. A moldable composition according to claim 26 wherein the polar organic solvent is tributyl phosphate.

32. A moldable composition according to claim 26 wherein the polar organic solvent is tricresyl phosphate.

33. A moldable composition according to claim 26 wherein the polar organic solvent is isodecyldiphenyl phosphate.

34. A moldable composition according to claim 26 wherein the polar organic solvent is an organic carbonate ester selected from the group consisting of dialkyl carbonates, arylalkyl carbonates, diaryl carbonates and cyclic carbonates and mixtures thereof.

35. A moldable composition according to claim 34 wherein the polar organic solvent is propylene carbonate.

36. A moldable composition according to claim 34 wherein the polar organic solvent is dibutyl carbonate.

37. A moldable composition according to claim 26 wherein the hydrocarbon solvent is selected from the group consisting of aromatic hydrocarbons, high boiling aromatic hydrocarbon mixtures and heavy aromatic naphthas.

38. A moldable composition according to claim 26 wherein the isocyanate component is a polyisocyanate having the general formula:

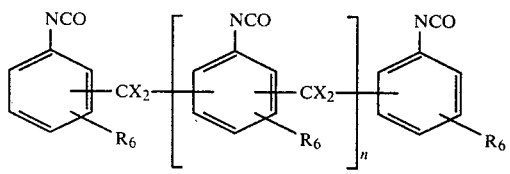

wherein $R_6$ is selected from the group consisting of hydrogen chlorine, bromine, alkyl groups having 1 to 5 carbon atoms and alkoxy groups having 1 to 5 carbon atoms, X is selected from the group consisting of hydrocarbon, alkyl groups having 1 to 10 carbon atoms and phenyl; and n has an average value of up to about 3.

39. A moldable composition according to claim 38 wherein the isocyanate component is methylene-bis(4-phenyl isocyanate).

40. A moldable composition according to claim 38 wherein the isocyanate component is polymethylene polyphenyl isocyanate.

41. A moldable composition according to claim 26 wherein the isocyanate component is employed in a range of about 15% to about 400% by weight, based on the total weight of the phenolic resin component.

42. A moldable composition according to claim 26 including polar organic solvent other than polar organic phosphate and polar organic carbonate esters.

43. A moldable composition according to claim 26 wherein the organic ester is present in a range of from about at least 2% by weight, based on the total weight of the phenolic resin component.

44. A moldable composition according to claim 26 wherein the catalyst is a tertiary amine.

45. A moldable composition according to claim 44 wherein the catalyst is trimethyl amine.

46. A moldable composition according to claim 44 wherein the catalyst is triethyl amine.

47. A moldable composition according to claim 44 wherein the catalyst is N,N-dimethylethanol amine.

48. A moldable composition according to claim 26 wherein the catalyst is employed in a range of from about 0.5% to about 15% by weight, based on the total weight of the phenolic resin component.

49. A moldable composition according to claim 26 including a silane coupling agent.

50. A moldable composition according to claim 26 wherein the binder is present in a range of from about 0.7% to about 4.0% by weight, based on the total weight of the composition.

51. A process for making foundry cores or molds comprising admixing aggregate material and a binding amount of a binding composition comprising (A) a phenolic resin component including at least one phenolic resin selected from the group consisting of phenolic resole resins and phenolic novolak resins, sufficient solvent to reduce the viscosity of the phenolic resin component to below about 1000 centipoises comprising a mixture of (1) hydrocarbon solvent and (2) polar organic solvent containing at least sufficient organic ester selected from the group consisting of organic phosphate and organic carbonate esters and mixtures thereof to increase the cure speed and solubility of said phenolic resin component, the organic phosphate esters having the formula:

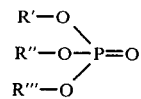

wherein R', R" and R'" may be any combination of alkyl, aryl, aryloxyalkyl, alkoxyalkyl, and substituted aryl groups wherein the radicals contain from 1 to 20 carbon atoms and the substituents on the aryl groups are selected from alkyl, alkoxy and aryl, and (B) an isocyanate component having a functionality of two or more, continuing mixing of the resultant admixture and coating said aggregate material with said binding composition, shaping the coated aggregate material as a core or mold, reacting components (A) and (B) in the presence of (C) sufficient catalyst to bring about substantially complete reaction between said components and forming a shaped foundry core or mold.

52. A process according to claim 51 wherein the catalyst is added to the shaped, coated aggregate material by gassing, said catalyst being passed through the shaped, coated aggregate material.

53. A process according to claim 51 wherein the catalyst is admixed with the aggregate material simultaneously with components (A) and (B).

54. A process according to claim 51 wherein the catalyst is added to the aggregate material subsequent to coating said aggregate material with components (A) and (B).

55. A process according to claim 51 wherein the catalyst is admixed with one of components (A) or (B) prior to coating of the aggregate material with said components.

56. A shaped foundry core or mold comprising foundry sand and a binding amount of a binder composition comprising the reaction product of (A) a phenolic resin component including at least one phenolic resin selected from the group consisting of phenolic resole resins and phenolic novolak resins and (B) an isocyanate component having a functionality of two or more; and polar organic solvent containing at least sufficient organic ester selected from the group consisting of organic phosphate and organic carbonate esters and mixtures thereof, the organic phosphate esters having the formula:

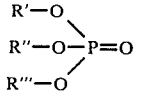

wherein R', R" and R'" may be any combination of alkyl, aryl, aryloxyalkyl, alkoxyalkyl, and substituted aryl groups wherein the radicals contain from 1 to 20 carbon atoms and the substituents on the aryl groups are selected from alkyl, alkoxy and aryl.

* * * * *

UNITED STATES PATENT AND TRADEMARK OFFICE
CERTIFICATE OF CORRECTION

PATENT NO. : 4,246,157
DATED : January 20, 1981
INVENTOR(S) : Robert A. Laitar

It is certified that error appears in the above-identified patent and that said Letters Patent are hereby corrected as shown below:

Column 3, line 65, before "-cyclohexyl" insert --p--.
Column 4, line 21, after "resins" insert --such--.
Column 7, line 68, "to" should read --the--.
Column 13, line 17, "solent" should read --solvent--.
Column 15, lines 42 and 43, "hydrocarbon" should read --hydrogen--.
Column 17, lines 22 and 23, "hydrocarbon" should read --hydrogen--.

Signed and Sealed this

Twelfth Day of May 1981

[SEAL]

Attest:

RENE D. TEGTMEYER

Attesting Officer

Acting Commissioner of Patents and Trademarks